United States Patent [19]

Aylor

[11] 4,172,336
[45] * Oct. 30, 1979

[54] WORM PACKAGE

[76] Inventor: Elmo E. Aylor, Rte. 1, Box 22A, Yerington, Nev. 89447

[*] Notice: The portion of the term of this patent subsequent to Nov. 1, 1994, has been disclaimed.

[21] Appl. No.: 845,656

[22] Filed: Oct. 26, 1977

Related U.S. Application Data

[63] Continuation-in-part of Ser. No. 693,498, Jun. 7, 1976, Pat. No. 4,055,911.

[51] Int. Cl.² ............................................. A01K 97/04
[52] U.S. Cl. ........................................... 43/55; 119/1
[58] Field of Search .................... 43/55; 206/362, 443; 229/DIG. 2; 119/1, 15

[56] References Cited

U.S. PATENT DOCUMENTS

| | | | |
|---|---|---|---|
| 3,006,106 | 10/1961 | Shuler | 43/55 |
| 3,631,973 | 1/1972 | Rode | 206/443 |
| 3,900,116 | 8/1975 | Gehri | 206/443 X |
| 4,055,911 | 11/1977 | Aylor | 43/55 |

FOREIGN PATENT DOCUMENTS 1118095 11/1961 Fed. Rep. of Germany ........... 206/443

Primary Examiner—James G. Smith
Attorney, Agent, or Firm—Charles F. Schroeder

[57] ABSTRACT

The present invention is related to a method and means for packaging earthworms or other light sensitive worms wherein superimposed layers of water absorbent sheet materials are spaced from each other substantially a worm thickness or more apart to provide compartment space for containment of worms and to which worms can crawl to hide and thereby, in effect, package themselves in aligned layered relation. More specifically, the package of the present invention can be a roll or a stack comprising superposed spaced layers of moisture absorbent sheet material with spacers therebetween such as corrugated cardboard which forms longitudinal channels or compartment spaces into which worms can and desire to crawl thereby to effect a self-packaging in aligned relation each to its own channel. The package can then be inserted in an air admitting container such as a perforated plastic bag or cup for handling and storage.

11 Claims, 12 Drawing Figures

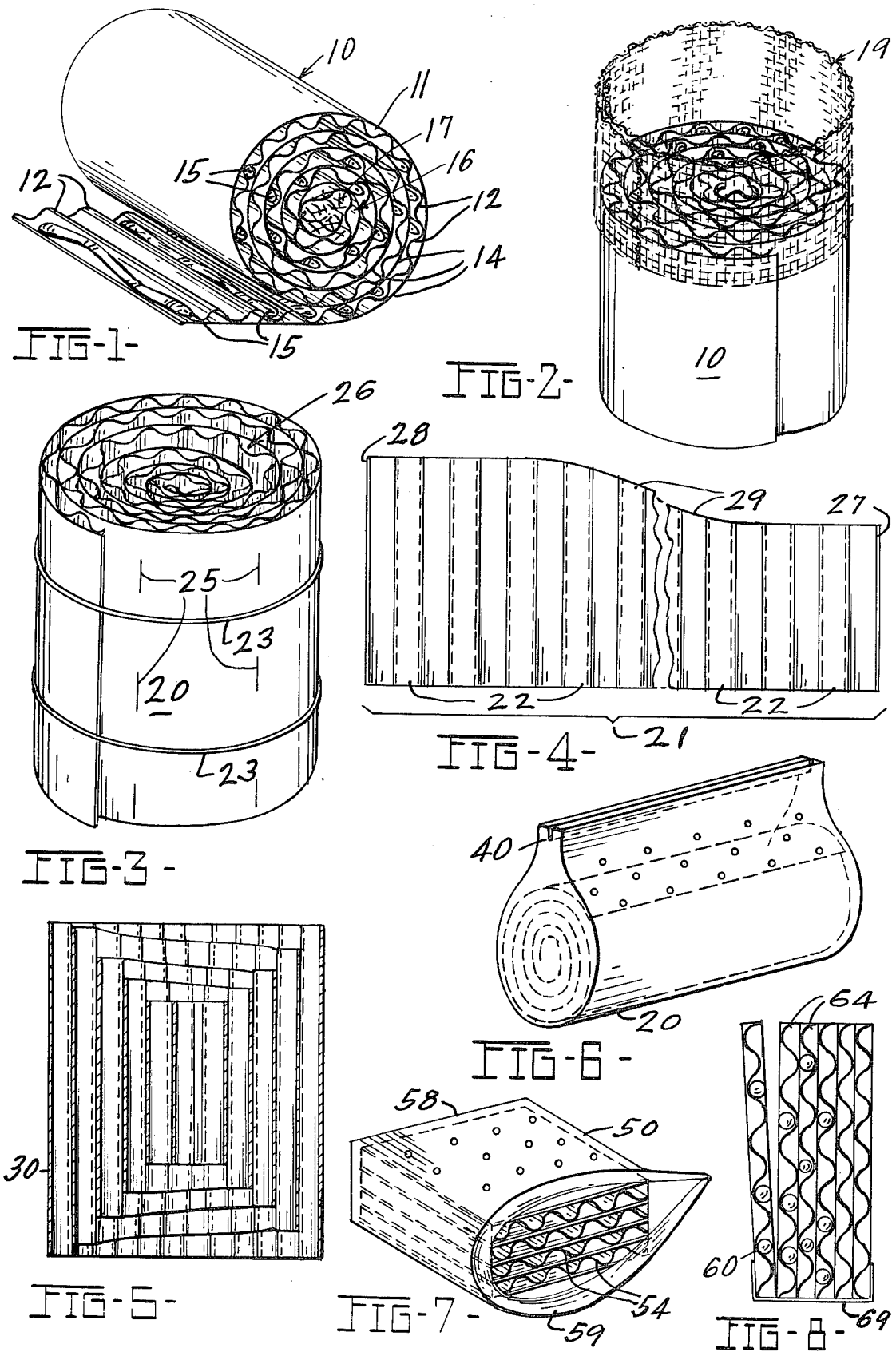

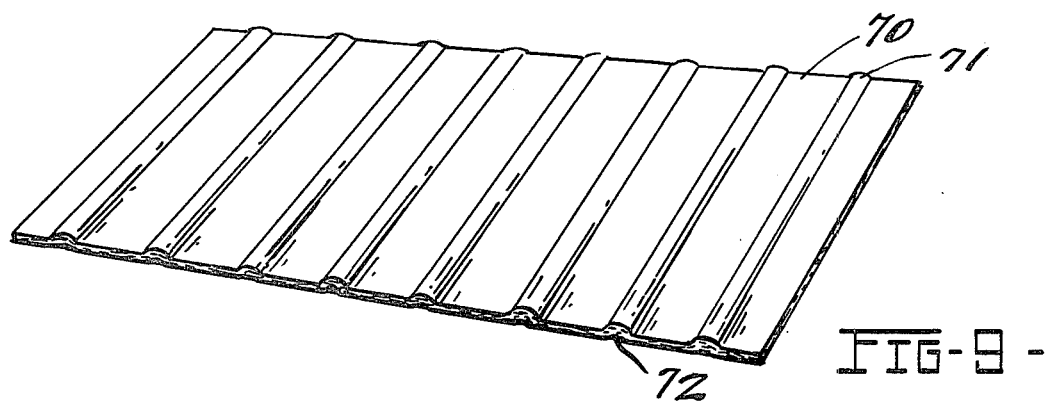
FIG-9-
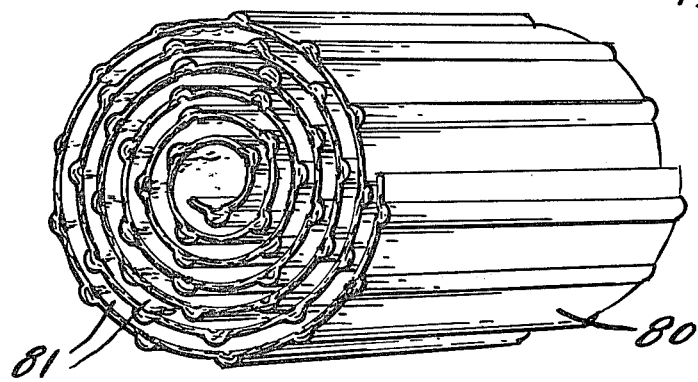
FIG-10-
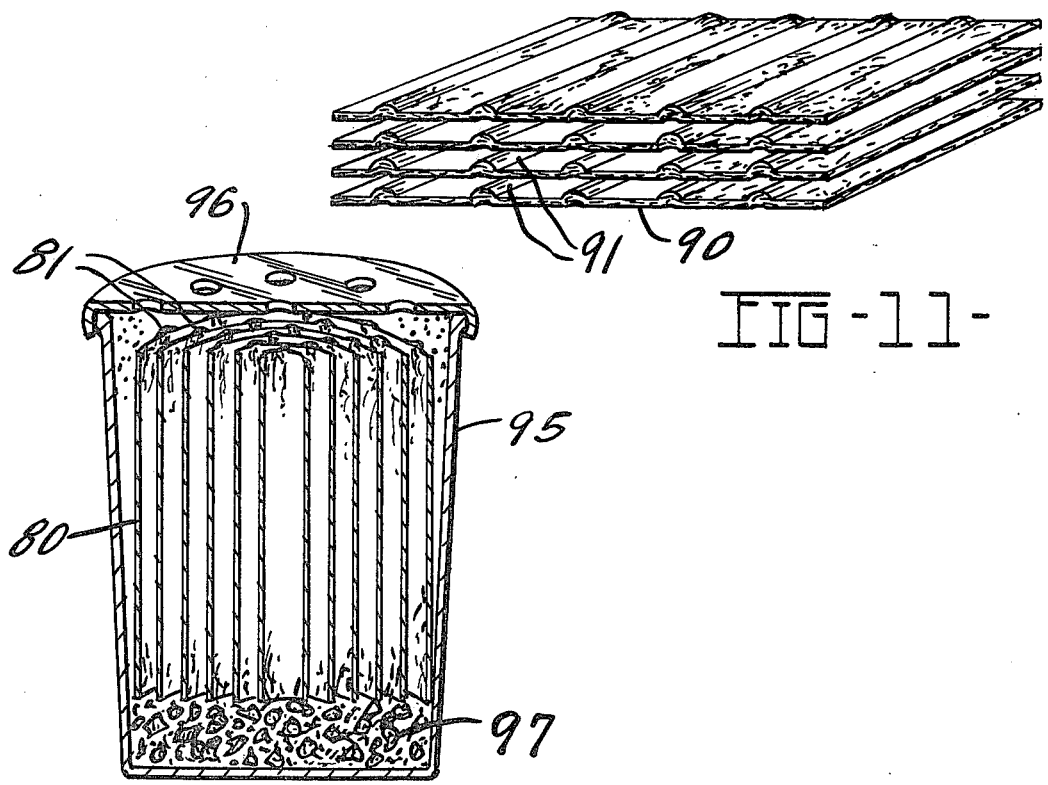
FIG-11-
FIG-12-

WORM PACKAGE

This is a continuation-in-part application of my patent application Ser. No. 693,498, filed on June 7, 1976, now U.S. Pat. No. 4,055,911.

It is an object of the present invention to provide a package for containment, shipment and storage of worms which will lend itself to efficient packaging of the worms as well as easy removal of the worms one-by-one as needed by the user such as a fisherman in the field.

It is another object of the present invention to provide a package for packaging of worms which is compartmentalized and constructed so that the worms seek out the compartments and crawl therein to, in a sense, package themselves in aligned layered relation.

It is still another object of the present invention to provide a worm package in which worm food and moisture can be readily incorporated to sustain the life of worms and correspondingly provide longer shelf life for sale and use of worms as needed. In one form of worm package made in accordance with the concepts of the present invention, cardboard sheet material is used of the type having a corrugated cardboard layer glued to a planar flexible paper cardboard sheet rolled into spiral form to provide a cylindrical package. If desired, a cylindrical opening may be provided in the center of the spiral package into which material such as peat moss can be inserted to provide supplementary moisture for sustained comfort and life of the worms. It has been found that worms will eat most cardboard as food when residing in the cardboard compartments of the present invention. The main moisture supply is provided by dipping the rolled package in water and soaking for a period of time. The peat moss or other suitable moisture providing material may then be inserted in the recess as a supplementary source. Thus the package will sustain the life of worms to enable a long storage life.

By spiral winding sheets of corrugated cardboard having a slight slant along one longitudinal edge as disclosed, a recess can be provided at one end of the package into which the worms as a group can be deposited to find their way into their respective compartments and into which peat moss can be stuffed for provision of moisture to each of the longitudinal channels or tubular compartments formed by the corrugations of the package.

The worms are caused to become self-packaged one or more to a compartment by depositing the number to be packaged at the end of a moistened package. Where the package end is not recessed as described above a porous light transmissive sheet, such as a screen is first placed around the package to contain them within the end region over the entrance to the corrugation channels whereupon the worms in seeking darkness will crawl into the longitudinal channels formed by the corrugations between sheet layers for shelter and self-compartmentalization. After the worms have crawled into the longitudinal compartments the screen is removed and the corrugated cardboard package may be inserted in a suitable container such as a hard plastic container having a perforated cover or in a perforated plastic bag.

If such packages are maintained on a shelf for a prolonged period such that they may become too dry, the rolls by themselves or if in a perforated container, can be dipped in water for a short period to provide the moisture necessary to sustain life of the worms. The perforations of the container also allow entry of air which is necessary to sustain the life of the worms. Since the worms like moist cardboard as food, life of the worms can be maintained in the package with air, moisture and a supply of food for a prolonged period.

Features of the invention lie in the ease of packaging the worms. According to applicant's invention, the worms themselves in effect crawl into alignment in layers in the novel package construction of the type disclosed.

Another feature of the invention lies in the ease in which worms can be obtained by peeling a portion of the package open such as by unrolling a roll-type package when a worm is desired by the user.

Another and important feature of the present invention lies in the long shelf life and ease of sustaining life of worms without need for additional food and moisture over prolonged periods of storage.

Other objects and features which are believed to be characteristic of my invention are set forth with particularity in the appended claims. My invention, however, both in organization and manner of construction together with further objects and features thereof may be best understood by reference to the following description taken in connection with the accompanying drawings in which:

FIG. 1 illustrates in perspective a partially unrolled worm package made in accordance with the concept of the present invention;

FIG. 2 illustrates the container of FIG. 1 with a light transmissive screen about an end region illustrating an arrangement for stimulating worms to package themselves in the container of the present invention;

FIG. 3 illustrates another package made in accordance with the principles of the present invention shown in its completely rolled form with a recess at one end into which moisture containing material may be inserted;

FIG. 4 illustrates a corrugated cardboard blank shaped such that when rolled it will form a package as shown in FIG. 3;

FIG. 5 is a cross-sectional perspective view of a package like that of FIG. 3 illustrating how recesses for holding moisture containing material can be provided.

FIG. 6 illustrates how the worm package of FIG. 2 may be contained in a perforated plastic envelope for greater ease of handling;

FIG. 7 illustrates another worm package made in accordance with the principles of the present invention wherein compartments are provided in layers which may be peeled off one by one to provide individual worms as desired;

FIG. 8 illustrates still another worm package made in accordance with the principles of this invention wherein compartment layers are provided in a book-like arrangement from which a layer of worms at a time may be torn as needed;

FIG. 9 illustrates in perspective a package blank which can be of cardboard, woodpulp or like material having spaced ridges and which can be rolled or stacked to provide other forms or compartmented packages of the present invention;

FIG. 10 illustrates in perspective a roll package formed of the blank shown in FIG. 9;

FIG. 11 illustrates a stacked worm package formed of a plurality of blanks of the type shown in FIG. 9; and FIG. 12 illustrates a cup type container and a compartmented worm roll assembly of the present invention.

Referring to the drawings in greater detail, the roll package 10 for containment of worms 15 is made of corrugated cardboard material. The corrugated cardboard planar sheet 11 is flexible in character to permit rolling. The corrugated cardboard sheet is glued to one side thereof to provide corrugations 12 which provide the worm compartments and which act as spacers to hold the sheet 11 in spaced relation from itself when rolled in spiral form. When the corrugated cardboard sheet is rolled in this fashion the sheet material in effect becomes a series of layers 14 in overlying relation in which the corrugations act to establish the spacing and provide the plurality of individual longitudinal worm compartments for containment of worms 15.

The roll of corrugated cardboard can be held together by one or more rubber or wire bands, string, or moisture resistant tape. When the user is ready to select a worm for use, the bands are removed to allow the package to become unrolled an amount sufficient to provide the number of worms desired as shown in FIG. 1.

FIG. 2 illustrates the manner in which the worms can be packaged in the package 10. The central opening 16 is blanked with peat moss and the roll is then dipped in water to moisten it. A light passing layer of material such as a screen 19 is then placed around an end region of moist package to form a fence for confinement of worms. The worms to be packaged are then deposited in the fenced region and in seeking darkness then crawl into the moist tube-like compartments formed of the corrguations 12. Since the space between the layers is made to be approximately a worm's thickness, the worms upon crawling into the compartments are in a sense cleaned of any extraneous material, such as peat moss into which they might have been contained prior to the packaging. Thus the worms in a sense clean themselves as they package themselves by crawling into the compartments.

It has been found that the worms in a matter of fifteen minutes or less will all crawl into the spaces provided in the container, whereupon the screen 19 can be removed and moist peat moss, or other moist material such as sponge or foam material containing moisture can be placed over the ends of the package. The cardboard in being porous material will absorb the moisture from the peat moss and will effect a cooling of the worms as moisture evaporates from the cardboard such as on hot dry days and thus retain them in moist condition for prolonged periods. If the package should become dry it can be dipped momentarily into a pail of water to reestablish the conditions desired for retaining another period of comfort for the worms.

FIG. 3 shows another package 20 made in accordance with the principles of my invention, like that of FIG. 1 but provided with a recess 26 at one end for loading worms and for holding moisture containing material such as peat moss which will provide the moisture to the worm compartment required for retention of worms in healthy condition. The recess also provides the confined region into which the worms may be deposited for their self-packaging and reduces or does away with the need for a special fence during the worm packaging period.

FIG. 4 illustrates the shape of a blank of corrugated sheet material 21 which can be rolled to form the package 20. The blank of corrugated cardboard sheet material 21 has a narrow end 27 and a wider width end 28, the smaller end being formed for the inner portion of the package. The narrow end 27 may be wound about a mandrel of about finger diameter dimension as in the arrangement of FIG. 1 but in the arrangement of FIG. 3 it is preferably wound without a core hole. The spiral rolled blank thus forms a series of layers of longitudinal compartments formed by the corrugations which also act as spacers dimensioned so that the space between layers will permit a worm to crawl therein in snug fit relation. Upon rolling the gradually increasing width blank 21 into the cylindrical package 20, the package acquires a stepped conical recess 26 at one end.

If desired the roll blank can also be slanted along both side edges to provide conical recesses at both ends of the package for retention of moisture material like peat moss.

FIG. 5 illustrates in cross-section such as package 30 of stepped configuration formed by the successive layers, illustrating the narrowest width layer on the interior and with each successive layer to the outer layer being slightly wider.

FIG. 6 illustrates the container installed in a plastic envelope 40 which is perforated to provide air which is necessary to sustain life of the worms. The envelope 40 can, for example, be a zip-lock type commercially available plastic envelope. With a package of proper dimension, upon installation of the container 20 into the envelope 40, moisture containing material such as the peat moss at the ends of the package, can be held in place by the edges of the envelope.

FIG. 7 illustrates still another embodiment of my invention wherein the worm compartments are provided by layers 54 of corrugated cardboard sheet material stacked into rectangular configuration and cut to desired length. A closing flap 59 can be provided to cover the worm compartments when not in use. A moist package 50 of this shape can be installed in an air admitting envelope such as a perforated envelope 58 with enclosing flaps 59. The worms to be packaged can be deposited over the corrugation channels and allowed to crawl into position. A layer of peat moss may be deposited over the worm channels to provide an environment to sustain life while food for the worms is provided by the cardboard itself.

If desired, additional food can be provided to the constructions of my invention by injecting food into the porous cardboard in liquid form such as peanut oil. Alternately, if desired, a dry type food can be provided, such as granulated sewage sludge distributed over the face of the corrugations within the container. In still another technique, food can be impregnated in the package by dipping it in a liquid food which will penetrate and impregnate the layers of porous material assuring presence of food in all areas of the package for sustenance of life for the worms. Still further food can be injected under alternate corrugations between the corrugated sheet and a planar backing.

The material in the corrugation channel can be of formulation such that it will seep through the moist porous corrugation sheets to provide food for worms on the opposite side over a prolonged period. Slits may also be cut in the corrugations to provide an edge for worms to feed on.

FIG. 8 illustrates another worm package 60 of my invention in which sheets of double faced corrugated cardboard 64 can be arranged in book-like form held together at a hinge 69. When worms are desired for use, a layer or page at a time can be torn away for use. The facing sheets then can be separated from the moist layer to expose the worms as needed.

When the corrugated sheet assembly is generally rectangular as in FIGS. 7 and 8, it can be shaped with a recess or loading cavity such as a "V" shape or dish shape at an edge at which the corrugation channels terminate to permit ready loading of worms for packaging. In both the cylindrical and rectangular packages, the loading cavity can be made of volume such that when filled, the number of worms deposited therein are metered to correspond to at least the minimum number to be packaged. That is when the group of worms deposited in the cavity is level with the top edge of the cavity, the number of worms therein will correspond to or be close to the number desired to be packaged. The worms thus loaded, upon exposure to light, will crawl into the corrugation channels of their own volition. The loaded package can be inserted in a transparent carrying bag before the worms crawl into their respective channels, thus minimizing the handling time for packaging since the worms will crawl into place after insertion in the bag or envelope.

The plastic envelope or bag into which the package is inserted can be pinpoint perforated for admission of air in locations such as adjacent the ends of the corrugation channels of the inserted package to promote a cross ventilation of air within the package while stored.

For convenience in removal of worms from the various packages described herein, the backing sheet alone, or the corrugated sheet, or the combination can be provided with slits as slits 25 shown in FIG. 3 or other suitable openings parallel to the corrugations to form tear off sections so that one or more worm strips might be torn from the package with minimum effort. The main body of the package can then be maintained in tact and torn off strips of worms removed and placed in a convenient location such as the user's pocket if desired. A convenient tear off strip might contain three or more worm containing channels.

It has been found that the concept of the invention can also be embodied in a moisture absorbent pliable sheet material having spacers integral with or inserted between layers of the sheet material. The sheet material can be cardboard or a woodpulp or like material which in a moistened condition is pliable and conformable to the dimensions of worms residing between stacked layers of the material. The layers need be spaced apart only so far as to allow one or more worms to crawl therebetween whereupon the moistened pliable material will conform to the shape of worms which might be larger than the spacing between layers. Thus both large worms, such a night crawlers, or smaller worms such as red worms can be packaged in the same sized package. A standard size package thus can be provided to accommodate a wide range of sizes of worms.

FIG. 9 shows a sheet 70 or blank of moisture absorbent material such as woodpulp having projecting ridges 71 integrally shaped therein to provide the desired spacing 81 between layers of the material when the blank is rolled into a roll package 80 as shown in FIG. 10 or stacked as shown in FIG. 11. Such blank sheets in commercially available form may be flat on its backside or may contain relatively shallow linear recesses 72 on the backside of the ridges 71 which can act as locking or nesting regions for ridges or spacers of underlying layers of sheet material, but are not necessarily required in the broadest context of the present invention.

As an alternate to the roll form 80, a plurality of blank sheets can be provided in a stacked layered rectangular package form 90 as shown in FIG. 11 with spaces 91 between layers. Although the ridges 71 in the blank sheet 70 are shown parallel to each other, it will be recognized that the spacing to accommodate the worms between layers does not dictate a need for parallel orientation of the ridges since skewed and curvilinear ridges might also be used. In addition short segmented or button shaped embossments press shaped into the sheet will also provide the desired spacing of layers of the sheet material. The spacing might also be provided by inserted spacers rather than integral spacers even though the latter are preferred in being the most convenient and readily available form. The distance between spacers can be appreciable but are preferably sufficiently close as to provide a bridged space for worms to reside within.

In one conventionally used arrangement for packaging of worms, they are placed in a mass of peat moss having little nutritional value. The worms, therefore, become undernourished and slowly starve and shrink by use of their own food reserves. If food is placed in the peat moss, the worms must eventually wallow in their own waste in the confined space of the package. These problems can be minimized in the arrangement of the present invention shown in FIG. 12 wherein a compartmented unit such as the roll 80 of FIG. 10 is placed in a container 95 over a layer of food 97 at the bottom of the container. The container might be in the form of a conventional coffee cup container with a lid 96 over its open end which can be provided with strategically located openings to allow escape of any toxic waste gases which might otherwise accumulate in the container. The cup 95 shown is tapered and of size to accomodate the roll package 80 so that its end preferably will rest on and be cushioned on the food. Alternately for some purposes such as special shipment, the relative size of the cup and roll package can be selected so that its lower end will rest solidly on the tapered interior wall of the cup. The combination thus lends itself to shipment of worms such as by mail service. The cup may be a standard liquid or food cup such as a styrofoam or wax paper cup.

The food 97 at the bottom of the cup is preferably a high protein food in moistened condition, for example moistened shorts from wheat having 15% protein. Although the material of the roll package itself will provide food for the worms, they will first eat the most nutritious first. Thus the food at the bottom of the cup is purposely made more palatable to the worms. When this food is exhausted, it has been found that the worms will next begin to eat the material of the package which holds them thus prolonging their packaged life span.

In the initial stages when they are eating the most nutritious food, it is found that the worms will eat with their forward or mouth ends in the direction of the food and will excrete their waste material or castings from their posterior ends at the opposite end of the roll. Thus their waste matter is separated from the food and the worms thereby maintain themselves in a healthier condition for a longer time than in other conventional worm packages.

If a rectangularly shaped layered worm package is to be provided, it can similarly be inserted conveniently in a correspondingly conforming sized rectangular package such as a conventional ice cream or cottage cheese cup.

In view of the foregoing, while the invention has been described in detail with regard to certain embodiments of my invention, it will be understood that my invention is not limited specifically to the particular construction shown and described and accordingly by the appended claims, all adaptions, modifications and arrangements thereof are contemplated which fall within the true spirit and scope of the invention.

I claim:

1. A worm package containing a plurality of worms comprising at least one layer of moisture absorbent sheet material overlying another layer of such sheet material to form worm compartments between layers of said sheet material, and
   spacer means disposed between said layers dimensioned to provide a space between said layers to permit a worm to reside in snug relation therebetween,
   said spacer means comprising spaced apart solid projections integral with one side of said sheet material while the portions of said sheet material overlying said spacer means provide a bearing surface for said spacer projections.

2. A worm package containing a plurality of worms as set out in claim 1 wherein said solid spacer means comprise linear spaced apart projecting linear ridges integral with one side of said sheet material.

3. A worm package according to claim 2 wherein the back side of said layers of sheet material is generally flat.

4. A worm package as set out in claim 2 formed of a sheet of said material rolled in spiral relation on itself to form a cylindrical package.

5. A worm package as set out in claim 2 formed of a plurality of sheets of said material stacked in overlying relation to form residence spaces for worms therebetween.

6. A worm package for worms comprising a closeable container holding therein a compartmented unit comprising at least one section of moisture absorbent sheet material supported in overlying relation over another section of sheet material to form worm compartments between layers of said sheet material,
   spacer means disposed between said layers of sheet material dimensioned to provide a space between said layers to permit worms to reside in snug relation therebetween,
   said worm compartments each having at least two openings thereto at least at one of which a mass of palatable food is provided for said worms while the other of which is sufficiently free of obstruction to allow worms to excrete waste material therefrom.

7. A worm package as set out in claim 6 wherein the sheet material is less nutritious food material for said worms than that provided by said mass of food.

8. A worm package as set out in claim 6 wherein the container is a cup having the shape of a truncated cone with the broadest diameter dimension at its open end and in which the compartmented unit is aligned with the openings to its worm compartments disposed over food at the bottom of the cup.

9. A worm package as set out in claim 8 wherein the compartmented unit is cylindrical in shape.

10. A worm package as set out in claim 6 wherein the container is cylindrical in shape.

11. A worm package as set out in claim 6 wherein the container is rectangular in shape.

* * * * *